United States Patent

De Meyer

[15] 3,701,284
[45] Oct. 31, 1972

[54] PRESSURE GAUGE

[72] Inventor: Roy W. De Meyer, Mount Prospect, Ill.

[73] Assignee: Colorado Manufacturing Corporation, Colorado Springs, Colo.

[22] Filed: Sept. 21, 1970

[21] Appl. No.: 73,705

[52] U.S. Cl..............................73/416, 137/527.6
[51] Int. Cl..........................G01l 7/04, G01d 11/24
[58] Field of Search.....73/416, 431; 220/44 R, 89 A; 137/467, 527.6

[56] References Cited

UNITED STATES PATENTS

| | | | |
|---|---|---|---|
| 1,192,574 | 7/1916 | Schubert | 73/416 |
| 3,141,335 | 7/1964 | Smith | 73/416 |
| 3,201,992 | 8/1965 | Hoff, Jr. | 73/416 X |
| 3,434,330 | 3/1969 | Ingham et al. | 73/416 X |
| 3,313,113 | 4/1967 | Maxson et al. | 220/89 A UX |
| 3,276,488 | 10/1966 | Holmes | 220/44 X |
| 2,358,228 | 9/1944 | Hoof | 137/467 X |

FOREIGN PATENTS OR APPLICATIONS

| | | | |
|---|---|---|---|
| 1,023,435 | 3/1966 | Great Britain | 73/416 |
| 604,995 | 5/1926 | France | 73/416 |

Primary Examiner—Louis R. Prince
Assistant Examiner—Daniel M. Yasich
Attorney—Pendleton, Neuman, Williams & Anderson

[57] ABSTRACT

A sliding, radial compression seal is provided between the main gauge casing and a movable blow-out closure element, in a fluid-filled pressure gauge, with yieldable retention of the closure in its normal case closing position. The closure seal insures maintenance of an effective fluig-tight seal of the gauge housing under normal conditions while permitting ready movement of the closure for release of unusual internal pressures.

8 Claims, 7 Drawing Figures

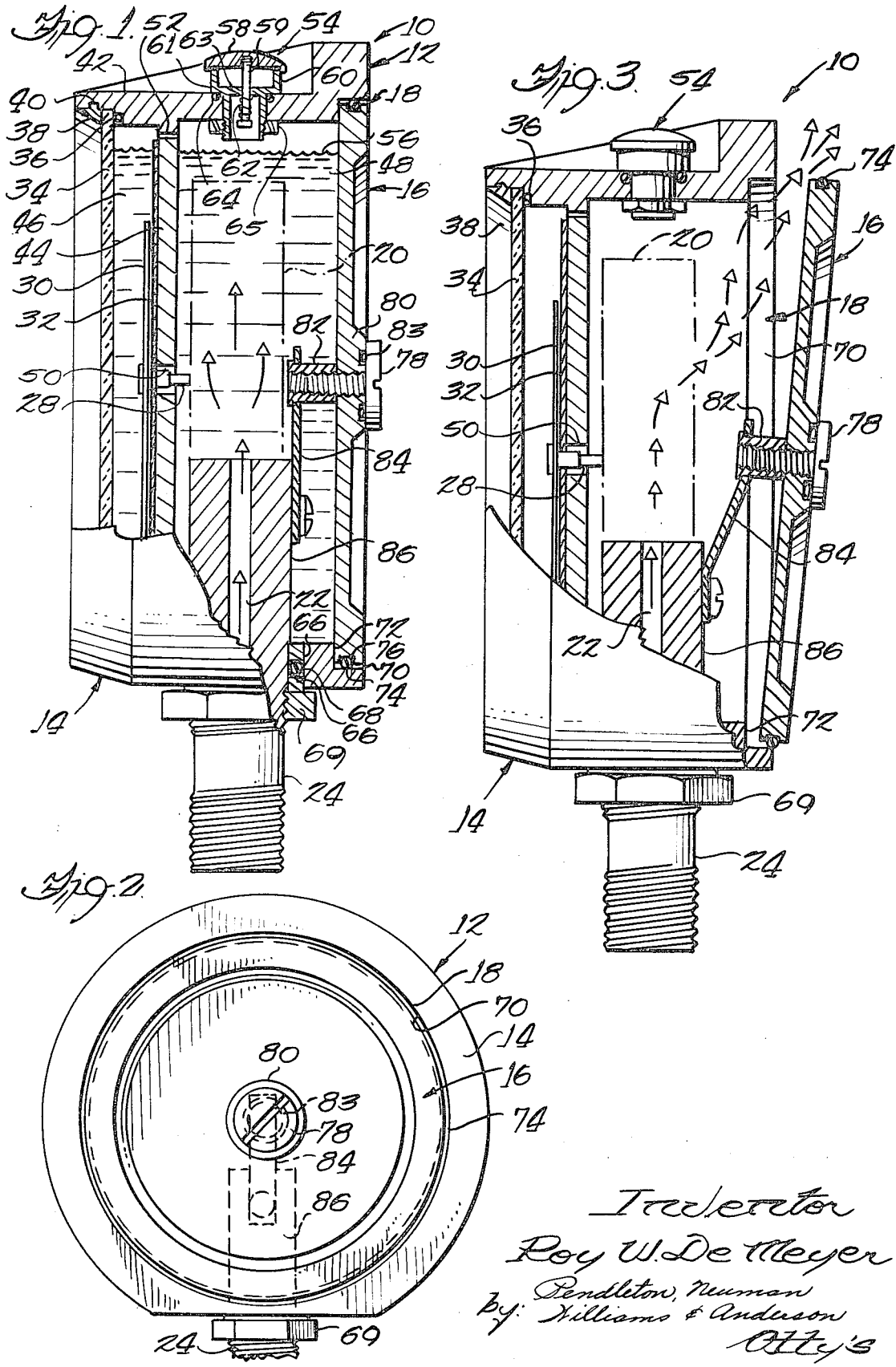

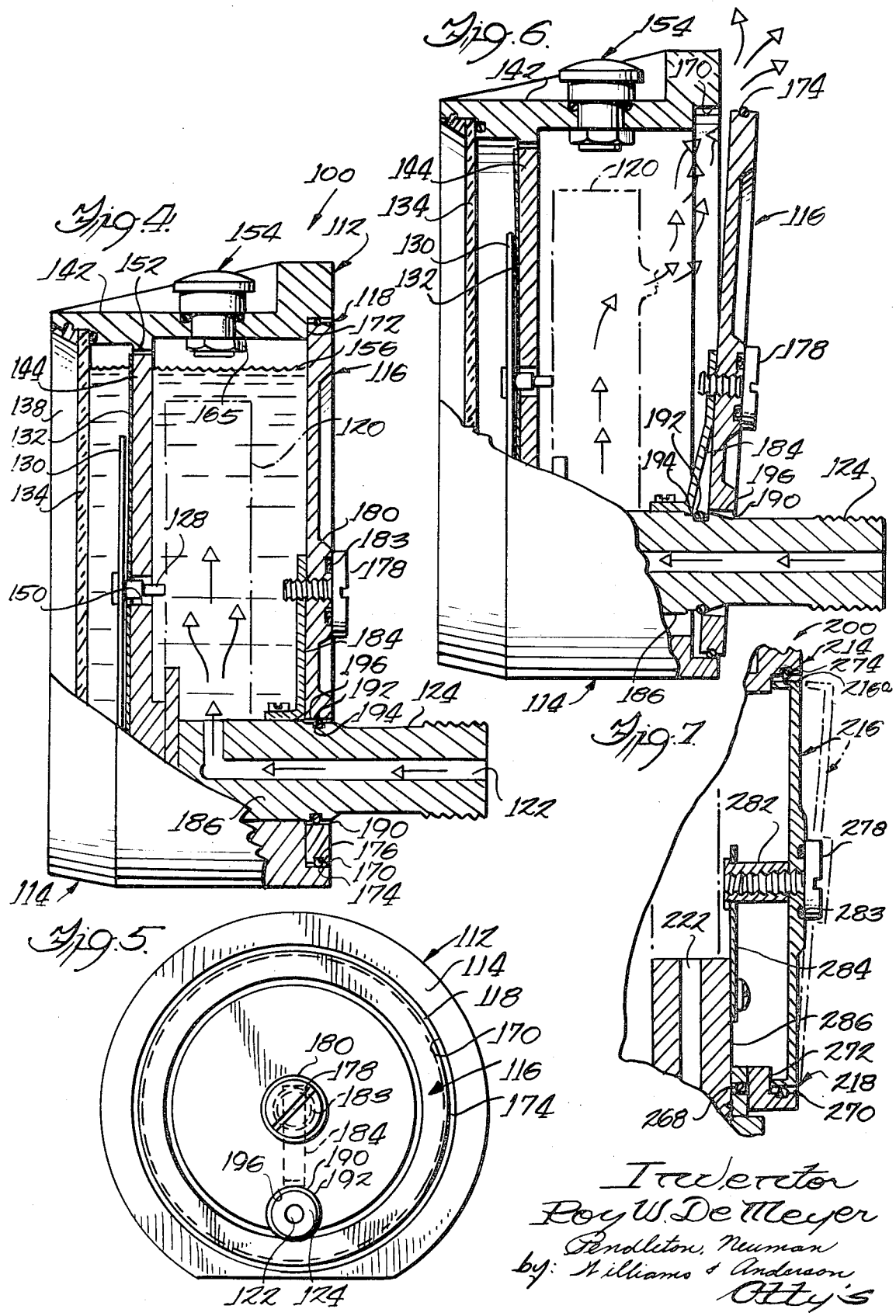

PRESSURE GAUGE

This invention relates to pressure gauges of the type having a blow-out closure for ready release of high pressures in the gauge housing, such as may be encountered in the event of a rupture of the pressure measuring mechanism or of an internal explosion, and more particularly relates to gauges of this type which are filled with liquid.

Many variations of gauge housings have been proposed which have at least one closure that is readily yieldable for controlled or directed release of unusually high internal pressure. In such gauges, a relatively strong wall is provided across the front of the gauge, behind the dial and indicating mechanism, with the yieldable blow-out closure being provided on the back or reverse side. In the event of an unusual increase of pressure in the gauge housing, as upon rupturing of a Bourdon tube or other pressure measuring device within the gauge, the resulting pressure increase or explosion is vented through the rear of the case by destruction, deflection or displacement of the blow-out closure. This assures venting of any undesigned-for pressures without causing shattering of the housing, and particularly without significant risk of breaking the face plate and/or front wall portions with attendant risk of projecting glass, broken pieces or other shrapnel into the area where operating personnel charged with observance of such gauges might be located. By way of example only, such prior designs have included spring retained cover plates, see Strandell U.S. Pat. No. 1,461,200, snap-in disks, see Brown U.S. Pat. No. 2,693,396, and deformable housing sections, see e.g. Strobl U.S. Pat. No. 2,803,138.

Gauges having the gauge housing filled with liquid afford certain advantages in some installations, as by way of providing continuous lubrication of the moving components, preventing corrosion and/or oxidation of the operating components, and damping out vibratory motions. However, this type of gauge presents particular problems when attempting to incorporate therein the blow-out safety feature previously attained in other gauges. Particularly, leakage of the fluid must be avoided, while providing for virtually instantaneous release of internal pressure in response to relatively small pressure increases, thereby obtaining the desired safety feature while avoiding leakage and maintaining the housing in its fluid-filled condition.

It is an object of this invention to provide an improved pressure gauge housing.

It is another object of this invention to provide an improved pressure gauge of the type providing for safety release of internal pressures.

It is another object of this invention to provide improvements in fluid-filled pressure gauges.

It is a further object of this invention to provide a pressure gauge which maintains a positive liquid-tight seal for retaining internal fluid while also affording safety release of unusual internal pressures.

Further and additional objects and advantages will appear from the following description, the accompanying drawings and the appended claims.

In carrying out this invention in one illustrative form, a fluid filled pressure gauge is provided wherein the pressure responsive mechanism is enclosed by a housing including a case and a blow-out closure element which is received within an opening in the case. Resilient sealing means is provided in compressive sealing engagement between the outer peripheral surface of the closure and the adjacent encompassing surface of the case which defines the opening. One of these surfaces is a cylindrical surface parallel to an axis through the opening and of sufficient axial extent to permit relative axial sliding movement between the case and closure, parallel to the noted axis, to disengage the closure from the opening and thereby release fluid pressure from within the housing. The closure is retained in its sealing position against inadvertent removal, and against such ambient pressure variations as might normally be encountered, by a resilient element which is secured to the main case and to the closure to yieldably resist the aforementioned relative sliding motion.

For a more complete understanding of this invention reference should now be had to the embodiments illustrated in the accompanying drawings and described below by way of examples of the invention. In these drawings, FIG. 1 is a side view, partially in section, of a pressure gauge employing teachings of this invention;

FIG. 2 is a rear view of the pressure gauge of FIG. 1, on a slightly reduced scale;

FIG. 3 is a view similar to FIG. 1 and illustrating a changed position of the closure member to release unusual internal pressure;

FIGS. 4, 5, and 6 are similar to FIGS. 1, 2, and 3 respectively and illustrate another pressure gauge employing teachings of this invention; and FIG. 7 is a partial sectional view, similar to FIG. 1, illustrating another embodiment employing teachings of this invention.

Referring now to the drawings, the pressure gauge 10 illustrated in FIGS. 1–3 includes a housing 12 comprising a main casing 14 and a rear closure plate 16 which fits within an opening 18 at the rear side of the case 14. The pressure responsive mechanism 20, such as a Bourdon tube, is disposed within the housing 12 and is in communication with a passage 22 which extends through a threaded socket connection element 24 for communication with a fluid system the pressure of which is to be sensed and indicated by the gauge 10.

The pressure responsive element 20 operates suitable indicating mechanism, as by flexing to rotate a shaft 28 which is connected to a pointer 30 that moves over a graduated dial 32 mounted within the housing 12 behind a transparent face plate or lens 34. An O-ring 36 provides sealing engagement between the face plate 34 and the casing, and a retaining ring 38 engages a groove 40 for retaining the face plate 34 in position and in sealing engagement with the ring 36.

The casing 14 includes a generally right circular cylindrical wall 42 which is integral with a forward wall 44 interposed between the pressure sensing element 20 on one side and the dial 32, lens 34 and related indicating mechanism on the opposite side. The wall 44 thus divides the housing 12 into two compartments 46 and 48. The wall 44 is of appropriate material and of adequate thickness to provide substantially the same pressure containing strength as the peripheral wall 42. A central axial opening 50 admits passage of the drive shaft 28 and is of sufficient size to permit flow of fluid from one side of wall 44 to the other, between the compartments 46 and 48, without being of adequate size to permit rapid build-up of fluid pressure in compartment 46 in the event of sudden pressure increase in the compartment 48. A vent aperture 52 is provided through the upper portion of wall 44 to assure appropriate movement of liquid between the compartments 46 and 48 during filling, draining and normal pressure change conditions.

A vented filler element 54 is provided in the upper portion of the case 14. This element may be of any construction to permit access for filling the housing 12 with a suitable liquid 56 while providing relief venting between the inside of the housing and the surrounding atmosphere. The device 54 should provide a liquid-tight seal to retain the liquid 56 in the housing 12 during shipment and under other normal conditions and should provide for venting communication with the atmosphere to accommodate internal pressure changes such as may be occasioned by changes in the ambient temperature and/or pressure. By way of example, the device 54 may be adapted to provide a fluid-tight seal under pressure differentials of up to about 5 psi with venting taking place at higher pressure differentials. One such device may comprise a cap 58 secured to a plunger 59 and seated on a mating ring 60 of the plug frame 61 under the force of a light compression spring 62 which is mounted on the plunger 59 and abuts spider struts 63 of the plug frame. Spring 62 will permit raising of the cap 58 for venting from the housing 12 under the aforenoted conditions. An O-ring 64 affords a seal between the device 54 and the case wall 42, with the entire unit 54 being secured to wall 42 by a nut 65. Other filler plugs may be utilized, one such alternative including a porous metal or ceramic element which will permit the passage of gasses while precluding the passage of liquids such as oil which may be used for the filler 56.

Clamping rings 66 retain an O-ring 68 which assures a fluid tight seal between wall 42 and the socket unit 24. A nut 69 secures these components together.

At its rear side the case 14 is provided with a counterbore comprising a right cylindrical surface 70, which delineates the opening 18, and a shoulder 72. The closure plate 16 is of circular configuration and is of a diameter slightly less than the diameter of the counterbore surface 70. An O-ring 74 is disposed in an annular recess 76 around the outer periphery of plate 16. The sealing ring 74 is in radial compressive sealing engagement with the periphery of closure 16, in recess 76, and with the surface 70 therearound.

A screw 78 extends through a boss 80 in the center of disk 16 and threadably engages a stud 82 on the inner side of disk 16. The underside of screw 78 abuts an O-ring 83 to provide a seal around the screw opening. The stud 82 engages or is attached to a resilient deformable cantilever element 84. The element 84 is attached to the inner portion 86 of the socket unit 24 and acts as a deformable leaf spring to retain the closure plate 16 in its seated, closed position as illustrated in FIG. 1.

It should be particularly noted that the sealing engagement between the plate 16 and the case 14 is obtained by radial compression of the O-ring 74 between the outer periphery of the plate 16 and the surrounding cylindrical surface 70. Thus this seal is effected by the compressive fit of these elements and is independent of the force provided by the yieldable element 84 for retaining the closure plate 16 in its closed position. Further, while the seal is dependent upon radial forces as noted, the surface 70 is parallel to a central axis through opening 18. Thereby, the plate 16 may be slid outward to an open, venting position as illustrated in FIG. 3 upon the application of force sufficient only to bend element 84 or otherwise cause this element to yield and to overcome the sliding friction of the O-ring 74 on the surface 70. Accordingly in the event of a rupture of the Bourdon tube 20 or other sudden increase of pressure within the housing 12, the closure plate 16 is readily moved to an open position such as that shown in FIG. 3 for ready venting of this unexpected and undesired pressure from compartment 48 to the rear of the gauge. This will avoid shattering of the wall 44 and/or the forward cover plate 34 and thus avoid dangers of ejecting liquid and projecting shrapnel toward the side where an observer may be located.

The openings 50 and 52 are of sufficiently small cross-sectional area to preclude rapid pressure increase in compartment 46 upon sudden increase of the pressure in compartment 48, whereby the closure 16 will be unseated for the rear venting described above before the pressure in compartment 50 is sufficient to break the plate 34.

The gauge 100 illustrated in FIGS. 4–6 is of the same construction as described above with respect to gauge 10 of FIGS. 1–3, with appropriate modifications for a rear connecting gauge. Accordingly, like components are identified by corresponding numbers in the 100 series and are not further described, except insofar as they differ from the components of gauge 10.

In gauge 100, the closure plate 116 is provided with an opening 190 which accomodates the rearwardly extending socket section 124. An O-ring 192 is received in an annular groove 194 in section 124 and engages a right circular cylindrical surface 196 which defines the opening 190. The surface 196 is parallel to the surface 170, whereby the plate 116 may move to the rear (to the right in FIGS. 3 and 6) for venting internal pressures upon sudden pressure increases within the housing 112, in the manner illustrated in FIG. 6.

In the embodiment 100, the yieldable retaining element 184 extends immediately adjacent the inner surface of the closure 116 and is directly threadably engaged by the screw element 178.

FIG. 7 illustrates a further embodiment 200 of the same general construction as the gauge 10. Like components are identified by corresponding numbers in the 200 series and are not further described except insofar as they differ from the components of gauge 10.

In the gauge 200 a resilient O-ring 274 is seated in an annular groove 298 formed in surface 270. The closure 216 is provided with a right circular cylindrical outer peripheral surface 216a which is in radial compressive sealing engagement with the O-ring when the closure is in its normal closed position, as shown in solid lines in FIG. 7. The closure 216 may be moved outward to an open position to release unusual pressure in the housing 212 by sliding of the surface 216a over the sealing ring 274 and yielding of the retainer 284 in the same general manner noted above in describing the embodiment of FIGS. 1–3, note the position of closure 216 illustrated in dashed lines in FIG. 7.

It will thus be seen the a pressure gauge has been provided which meets the aforestated objects.

It will be obvious that other modifications of the specific embodiments shown may be made without departing from the spirit and scope of this invention.

While particular embodiments of this invention are shown and described herein, it will be understood of course that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. A liquid filled pressure gauge assembly comprising pressure responsive mechanism, a housing enclosing said mechanism, and liquid substantially filling said housing, said housing including a case having an opening delineated by an internal surface of a portion of said case, and a removable blow-out closure disposed within said opening and having an outer peripheral surface which conforms generally to said internal surface and is in adjacent opposed relation to said internal surface, and resilient sealing means in radial compressive sealing engagement between said outer peripheral surface of said closure and said adjacent internal surface of said case to provide a liquid-tight closure of said opening, one of said surfaces being a cylindrical surface extending parallel to an axis through said opening and of sufficient axial extent to permit relative sliding movement between said resilient means and said cylindrical surface parallel to said axis for disengagement of said closure from sealing engagement with said case to release fluid pressure from within said housing, and means for yieldably retaining said closure in such sealing engagement in said opening.

2. A pressure gauge as in claim 1 wherein said retaining means comprises a yieldable member attached to said case and to said closure.

3. A pressure gauge as in claim 2 wherein said yieldable member comprises a bendable element.

4. A pressure gauge as in claim 1 wherein said cylindrical surface comprises said internal surface.

5. A pressure gauge as in claim 1 wherein said cylindrical surface comprises said outer peripheral surface.

6. A pressure gauge as in claim 1 wherein said internal surface is a right circular cylindrical surface extending outward through one side of said case, said closure being a circular plate, and said resilient sealing means being mounted on said closure.

7. A pressure gauge as in claim 7 wherein said resilient sealing means is an O-ring circumscribing said closure.

8. A pressure gauge as in claim 1 including a connection socket extending through said opening for communication with a fluid system and having an annular sealing surface, said closure having an annular surface extending circumjacent said annular sealing surface of said socket, and resilient sealing means between and in compressive sealing engagement with said annular surfaces of said connection socket and said closure.

* * * * *

UNITED STATES PATENT OFFICE
CERTIFICATE OF CORRECTION

Patent No. 3,701,284      Dated October 31, 1972

Inventor(s) ROY W. DeMEYER

It is certified that error appears in the above-identified patent and that said Letters Patent are hereby corrected as shown below:

In the Abstract, line 6, "fluig-tight" should read -- fluid-tight --; Column 5, line 1, "the" should read -- that --; and Column 6, line 20 (claim 7) "claim 7" should read -- claim 6 --.

Signed and sealed this 24th day of April 1973.

(SEAL)
Attest:

EDWARD M. FLETCHER, JR.
Attesting Officer

ROBERT GOTTSCHALK
Commissioner of Patents